US012770394B2

(12) United States Patent
Sawant et al.

(10) Patent No.: US 12,770,394 B2
(45) Date of Patent: Oct. 20, 2026

(54) METHODS AND SYSTEMS FOR CROP DAMAGE ASSESSMENT USING SEMANTIC REASONING

(71) Applicant: Tata Consultancy Services Limited, Mumbai (IN)

(72) Inventors: Suryakant Ashok Sawant, Pune (IN); Ankur Pandit, Indore (IN); Srinivasu Pappula, Hyderabad (IN); Jayantrao Mohite, Thane (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 217 days.

(21) Appl. No.: 18/744,432

(22) Filed: Jun. 14, 2024

(65) Prior Publication Data

US 2024/0428582 A1 Dec. 26, 2024

(30) Foreign Application Priority Data

Jun. 23, 2023 (IN) ............................. 202321042217

(51) Int. Cl.
*G06V 20/10* (2022.01)
*G06N 20/00* (2019.01)
(Continued)

(52) U.S. Cl.
CPC ........... *G06V 20/188* (2022.01); *G06N 20/00* (2019.01); *G06Q 50/02* (2013.01); *G06V 10/764* (2022.01)

(58) Field of Classification Search
None
See application file for complete search history.

(56) References Cited

U.S. PATENT DOCUMENTS 10,062,119 B2 8/2018 Groeneveld
2015/0073716 A1 3/2015 Johnson
(Continued)

FOREIGN PATENT DOCUMENTS

WO WO2021191772 A1 * 9/2021 ............... G06N 5/04
WO WO2022132912 A1 6/2022

OTHER PUBLICATIONS

Xingtong GE et al., Title: Disaster Prediction Knowledge Graph Based on Multi-Source Spatio-Temporal Information Title of the item: Remote Sensing, 2022, vol. 14; Issue: 5, Publisher: MDPI, https://www.mdpi.com/2072-4292/14/5/1214.

*Primary Examiner* — Leon Viet Q Nguyen
(74) *Attorney, Agent, or Firm* — Finnegan, Henderson, Farabow, Garrett & Dunner, LLP

(57) ABSTRACT

The disclosure generally relates to methods and systems for crop damage assessment using semantic reasoning. Conventional techniques using only specific data either individually or in a combination may result in bias and may not accurately estimate the crop damage, due to diversity in each of the natural calamities. The present disclosure solves the technical problems in the art using domain ontologies and a semantic reasoning over the spatio-temporal data for the automatic assessment of the crop damage due to the natural calamities. The present disclosure establishes automated crop loss assessment using trigger-based analysis of plurality of sources like satellite-based earth observations, weather observations, social media posts and news articles, for obtaining a spatio-temporal data. Then the spatio-temporal data is reasoned over the domain knowledge graph, using the semantic reasoning technique, for the crop damage assessment.

20 Claims, 11 Drawing Sheets

(51) Int. Cl.
*G06Q 50/02* (2012.01)
*G06V 10/764* (2022.01)

(56) References Cited

U.S. PATENT DOCUMENTS

| | | | | |
|---|---|---|---|---|
| 2015/0278966 | A1* | 10/2015 | Johnson ............... | G06Q 10/063 702/2 |
| 2016/0063639 | A1 | 3/2016 | Groeneveld | |
| 2022/0107298 | A1* | 4/2022 | Miresmailli ........... | G08C 17/02 |

* cited by examiner

Total one affected region
Semantic relation
Affected region 1 is along entire east edge of region of interest

METHODS AND SYSTEMS FOR CROP DAMAGE ASSESSMENT USING SEMANTIC REASONING

PRIORITY CLAIM

This U.S. patent application claims priority under 35 U.S.C. § 119 to: Indian patent application No. 202321042217, filed on Jun. 23, 2023. The entire contents of the aforementioned application are incorporated herein by reference.

TECHNICAL FIELD

The disclosure herein generally relates to agriculture crop damage assessment, and, more particularly, to methods and systems for crop damage assessment using semantic reasoning.

BACKGROUND

Agriculture has diversity across the globe. Estimating a sustainable agriculture production is utmost important to meet the demands of the highly increasing population. However, natural calamities such as pest, disease, temperature, events such as frost, wind, floods due to heavy rainfall, desert locust, earthquakes, land subsidence, and so on, cause a huge amount of agriculture crop damage and affect the yield every year in one or other locations across the globe. Hence, assessing the crop damage due to such one or more natural calamities, is necessary to estimate a shortage of agriculture produce and take proper measures, for meeting the demands of the highly increasing population.

Researchers have attempted to use mostly manual survey-based techniques, traditional analysis-based approaches for assessment of the crop damage due to one or more such natural calamities. Some conventional techniques use spatio-temporal data related to weather, events of the natural calamities using satellite data, and so on either individually or in a combination, for assessing the crop damage. However, such conventional and manual survey-based techniques may not be used effectively for assessing the crop damage, due to diversity in each of the natural calamities discussed above. For example, some attempts have been made to use only the weather data to predict the movement specific to desert locust. Some other attempts have been made to use only the spatio-temporal satellite data to predict the movement and estimate the crop damage in case of floods. Some other attempts have been focused on using a combination of satellite image data analysis and geological information for estimating the crop damage due to floods.

Hence, the conventional techniques using only specific data either individually or in a combination may result in bias and may not accurately estimate the crop damage, due to diversity in each of the natural calamities. Further, the conventional techniques for assessing the crop damage are limited on providing useful insights over the crop damage such as how much area is damaged, at what location, and so on. Further, the conventional techniques used for assessing the crop damage are not universal in a sense that each one of such conventional techniques may not be effectively used for covering each of the natural calamity types, without considering their inter-relationships with specific crop type. For example, an excess rainfall in short durations may not heavily damage the sugarcane crop, but significantly damages the paddy crops. Similarly, a high intensity winds with longer durations may impact banana crops, mango crops, coconut crops, and so on, but may not impact much in the damage for onion crops.

SUMMARY

Embodiments of the present disclosure present technological improvements as solutions to one or more of the above-mentioned technical problems recognized by the inventors in conventional systems.

In an aspect, a processor-implemented method for crop damage assessment using semantic reasoning is provided. The method including the steps of: receiving one or more input observations associated with one or more natural calamities, for a predefined region of interest (ROI), from one or more input resources, using a natural language processing (NLP) technique, wherein the predefined region of interest (ROI) is represented with latitude and longitude coordinates; identifying one or more events associated with the one or more natural calamities and a potential crop damage, for the predefined region of interest (ROI), based on the one or more input observations, using a pre-trained event classification model; estimating an extent of crop damage, for the predefined region of interest (ROI), based on the one or more events, using one or more crop damage estimation techniques, wherein the extent of crop damage is one of (i) no crop damage, (ii) a low crop damage, (iii) a medium crop damage, and (iv) a severe crop damage; estimating one or more crop damage assessment parameters comprising a crop damage region, and a crop damage region percentage, from the predefined region of interest (ROI), based on the one or more events associated with the one or more natural calamities and with the potential crop damage, when the extent of crop damage is other than the no crop damage, using one or more land use and land cover (LULC) parameters; deriving one or more base relations, for the predefined region of interest (ROI), between (i) the one or more events associated with the one or more natural calamities, (ii) the extent of crop damage, (iii) the one or more crop damage assessment parameters, and (iv) the one or more land use and land cover (LULC) parameters, using one or more domain ontologies; generating one or more semantic relations, from the (i) one or more events associated with the one or more natural calamities, (ii) the extent of crop damage, (iii) the one or more crop damage assessment parameters, and (iv) the one or more land use and land cover (LULC) parameters, based on the one or more base relations, using a semantic reasoning technique and one or more topological relations; and determining one or more insights of crop damage due to the one or more natural calamities, for a predefined region of interest (ROI), based on the one or more semantic relations and the one or more crop damage assessment parameters.

In another aspect, a system for crop damage assessment using semantic reasoning is provided. The system includes: a memory storing instructions; one or more Input/Output (I/O) interfaces; and one or more hardware processors coupled to the memory via the one or more I/O interfaces, wherein the one or more hardware processors are configured by the instructions to: receive one or more input observations associated with one or more natural calamities, for a predefined region of interest (ROI), from one or more input resources, using a natural language processing (NLP) technique, wherein the predefined region of interest (ROI) is represented with latitude and longitude coordinates; identify one or more events associated with the one or more natural calamities and a potential crop damage, for the predefined region of interest (ROI), based on the one or more input observations, using a pre-trained event classification model; estimate an extent of crop damage, for the predefined region of interest (ROI), based on the one or more events, using one or more crop damage estimation techniques, wherein the extent of crop damage is one of (i) no crop damage, (ii) a low crop damage, (iii) a medium crop damage, and (iv) a severe crop damage; estimate one or more crop damage assessment parameters comprising a crop damage region, and a crop damage region percentage, from the predefined region of interest (ROI), based on the one or more events associated with the one or more natural calamities and with the potential crop damage, when the extent of crop damage is other than the no crop damage, using one or more land use and land cover (LULC) parameters; derive one or more base relations, for the predefined region of interest (ROI), between (i) the one or more events associated with the one or more natural calamities, (ii) the extent of crop damage, (iii) the one or more crop damage assessment parameters, and (iv) the one or more land use and land cover (LULC) parameters, using one or more domain ontologies; generate one or more semantic relations, from the (i) one or more events associated with the one or more natural calamities, (ii) the extent of crop damage, (iii) the one or more crop damage assessment parameters, and (iv) the one or more land use and land cover (LULC) parameters, based on the one or more base relations, using a semantic reasoning technique and one or more topological relations; and determine one or more insights of crop damage due to the one or more natural calamities, for a predefined region of interest (ROI), based on the one or more semantic relations, and the one or more crop damage assessment parameters.

In yet another aspect, there are provided one or more non-transitory machine-readable information storage mediums comprising one or more instructions which when executed by one or more hardware processors cause: receiving one or more input observations associated with one or more natural calamities, for a predefined region of interest (ROI), from one or more input resources, using a natural language processing (NLP) technique, wherein the predefined region of interest (ROI) is represented with latitude and longitude coordinates; identifying one or more events associated with the one or more natural calamities and a potential crop damage, for the predefined region of interest (ROI), based on the one or more input observations, using a pre-trained event classification model; estimating an extent of crop damage, for the predefined region of interest (ROI), based on the one or more events, using one or more crop damage estimation techniques, wherein the extent of crop damage is one of (i) no crop damage, (ii) a low crop damage, (iii) a medium crop damage, and (iv) a severe crop damage; estimating one or more crop damage assessment parameters comprising a crop damage region, and a crop damage region percentage, from the predefined region of interest (ROI), based on the one or more events associated with the one or more natural calamities and with the potential crop damage, when the extent of crop damage is other than the no crop damage, using one or more land use and land cover (LULC) parameters; deriving one or more base relations, for the predefined region of interest (ROI), between (i) the one or more events associated with the one or more natural calamities, (ii) the extent of crop damage, (iii) the one or more crop damage assessment parameters, and (iv) the one or more land use and land cover (LULC) parameters, using one or more domain ontologies; generating one or more semantic relations, from the (i) one or more events associated with the one or more natural calamities, (ii) the extent of crop damage, (iii) the one or more crop damage assessment parameters, and (iv) the one or more land use and land cover (LULC) parameters, based on the one or more base relations, using a semantic reasoning technique and one or more topological relations; and determining one or more insights of crop damage due to the one or more natural calamities, for a predefined region of interest (ROI), based on the one or more semantic relations and the one or more crop damage assessment parameters.

In an embodiment, the one or more input observations associated with one or more natural calamities, comprises a temperature, a relative humidity, a wind speed, an intensity and a duration of rainfall, earthquakes, a land subsidence, a social media sentiment, and a topic of news report.

In an embodiment, the pre-trained event classification model is obtained by: receiving a training data comprising a plurality of training samples, wherein the training data is associated with one or more historical input observations and corresponding one or more historical events associated with the one or more natural calamities happened with the potential crop damage; and training a machine learning (ML) classification model, with the plurality of training samples present in the training data, to obtain the pre-trained event classification model.

In an embodiment, the one or more crop damage estimation techniques are (i) a change detection technique, (ii) an interferometric analysis of synthetic aperture radar (SAR) data, and (iii) an image differential analysis.

In an embodiment, the one or more crop damage estimation techniques utilizes one or more parameters comprising (i) one or more normalized difference vegetation index (NDVI) differences, (ii) one or more coherence values, and (iii) one or more backscatter differences, to estimate the extent of crop damage, for the predefined region of interest (ROI).

In an embodiment, the one or more base relations, for the predefined region of interest (ROI), are derived by: identifying the one or more domain ontologies based on the one or more events associated with the one or more natural calamities, from a domain ontology repository; and aligning the one or more domain ontologies, using the natural language processing (NLP) technique, to obtain an aligned domain ontology, wherein the aligned domain ontology comprises the one or more base relations between (i) the one or more events associated with the one or more natural calamities, (ii) the extent of crop damage, (iii) the one or more crop damage assessment parameters, and (iv) the one or more land use and land cover (LULC) parameters.

In an embodiment, the one or more semantic relations, are generated by: retrieving one or more tokens, from an information related to the one or more events associated with the one or more natural calamities, for the predefined region of interest (ROI), using the natural language processing (NLP) technique, wherein each token is one among a word, a character, and a group of characters present in the information related to the one or more events associated with the one or more natural calamities; and querying the one or more tokens, over the one or more base relations, using (i) the semantic reasoning technique and (ii) the one or more topological relations, to generate the one or more semantic relations, based on (i) the one or more events associated with the one or more natural calamities, (ii) the extent of crop damage, (iii) the one or more crop damage assessment parameters, and (iv) the one or more land use and land cover (LULC) parameters.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
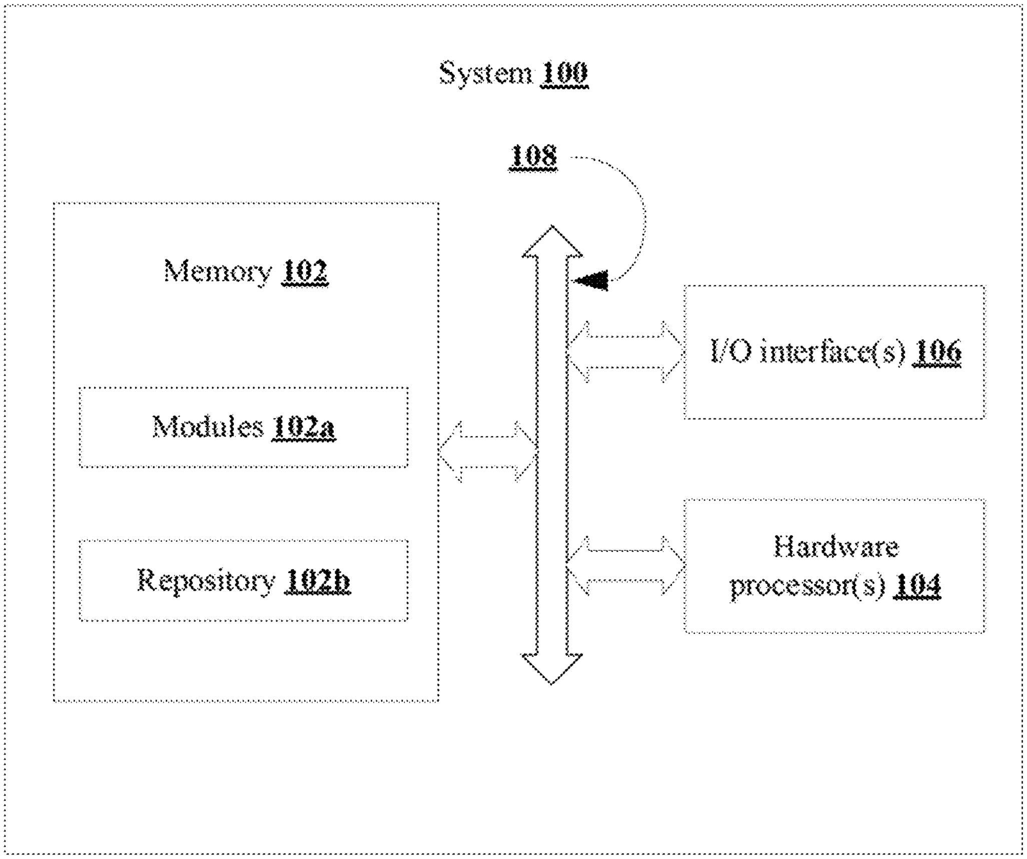
FIG. 1 is an exemplary block diagram of a system for crop damage assessment using semantic reasoning, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Conventional techniques for estimating a crop damage due to natural calamity, use mostly manual survey-based techniques, traditional analysis-based approaches, and so which are not accurate and efficient. Further, the conventional techniques use only specific data either individually or in a combination may result in bias and may not accurately estimate the crop damage, due to diversity in each of the natural calamities. Further, the conventional techniques used for assessing the crop damage are not universal in a sense that each one of such conventional techniques may not be effectively used for covering each of the natural calamity types, without considering their inter-relationships with specific crop type.

The present disclosure solves the technical problems in the art using domain ontologies and a semantic reasoning over the spatio-temporal data for the automatic assessment of the crop damage due to the natural calamities. The present disclosure has capability to interlink the multiple data sets like satellite-based earth observations, weather observations from IoT sensors, crop knowledge base and disaster domain knowledge for the crop damage assessment using domain ontologies and semantic reasoning. The present disclosure establishes automated crop loss assessment using a trigger-based analysis on a plurality of sources such as satellite-based earth observations, weather observations, social media posts and news articles, for obtaining the spatio-temporal data. Then the spatio-temporal data is reasoned over the domain knowledge graph, using the semantic reasoning technique, for the crop damage assessment. The present disclosure helps to generate the additional insights on crop damage which anyways lacking in the conventional analysis approaches.

Referring now to the drawings, and more particularly to FIG. 1 through FIG. 10, where similar reference characters denote corresponding features consistently throughout the figures, there are shown preferred embodiments and these embodiments are described in the context of the following exemplary systems and/or methods.

FIG. 1 is an exemplary block diagram of a system 100 for crop damage assessment using semantic reasoning, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102*a* and a repository 102*b* for storing data processed, received, and generated by one or more of the plurality of modules 102*a*. The plurality of modules 102*a* may include routines, programs, objects, components, data structures, and so on, which perform particular tasks or implement particular abstract data types.

The plurality of modules 102*a* may include programs or computer-readable instructions or coded instructions that supplement applications or functions performed by the system 100. The plurality of modules 102*a* may also be used as, signal processor(s), state machine(s), logic circuitries, and/or any other device or component that manipulates signals based on operational instructions. Further, the plurality of modules 102*a* can be used by hardware, by computer-readable instructions executed by the one or more hardware processors 104, or by a combination thereof. In an embodiment, the plurality of modules 102*a* can include various sub-modules (not shown in FIG. 1). Further, the memory 102 may include information pertaining to input(s)/output(s) of each step performed by the processor(s) 104 of the system 100 and methods of the present disclosure.

The repository 102*b* may include a database or a data engine. Further, the repository 102*b* amongst other things, may serve as a database or includes a plurality of databases for storing the data that is processed, received, or generated as a result of the execution of the plurality of modules 102*a*. Although the repository 102*b* is shown internal to the system 100, it will be noted that, in alternate embodiments, the repository 102*b* can also be implemented external to the system 100, where the repository 102*b* may be stored within an external database (not shown in FIG. 1) communicatively coupled to the system 100. The data contained within such external database may be periodically updated. For example, data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102*b* may be distributed between the system 100 and the external database.

Figure 2:
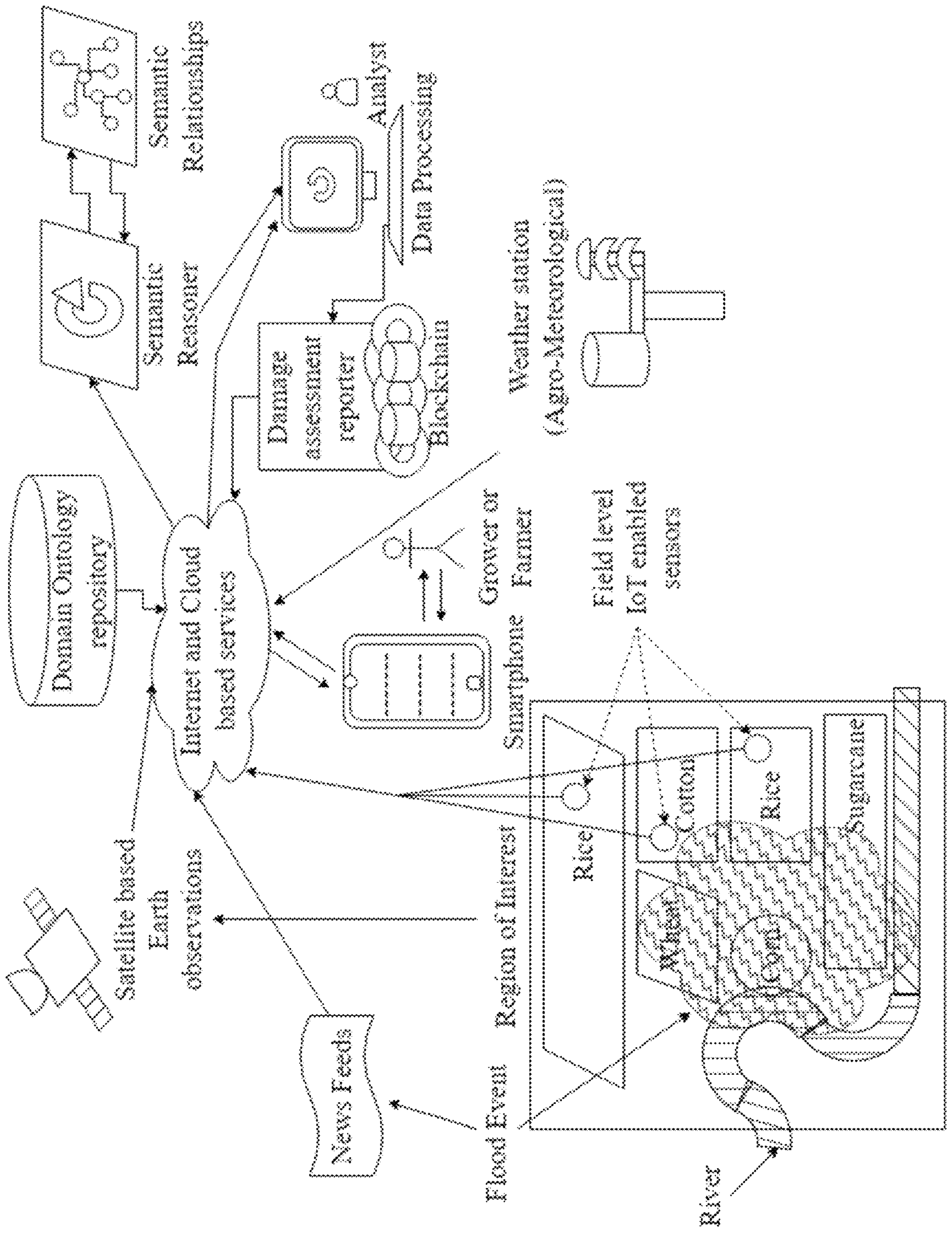
FIG. 2 is an exemplary block diagram illustrating modules of the system of FIG. 1 for generating optimal coverage plan to perform agricultural activities, in accordance with some embodiments of the present disclosure.

Referring collectively to FIG. 2, FIG. 3, and FIG. 4A and FIG. 4B, components and functionalities of the system 100 are described in accordance with an example embodiment of the present disclosure. For example, FIG. 2 is an exemplary block diagram illustrating modules of the system 100 of FIG. 1 for crop damage assessment using semantic reasoning, in accordance with some embodiments of the present disclosure. As shown in FIG. 2, the modules include an internet and cloud based services, an event verification module (not shown in FIG. 2), a domain ontology repository, a semantic reasoner, a damage assessment reporter, and an analyst.

The analyst is typically a user who assesses the crop damage using the semantic reasoner. An input information related to events of natural calamities for a given region of interest (ROI), is received through the internet and cloud based services, from various sources such as field-level internet-of-things (IoT) sensors, news feeds, satellite-based earth observations, smart phone maintained by farmer (also called as a crop grower), weather station and so on. The events related to natural calamities or not, is verified by the event verification module present inside the internet and cloud based services. If the event related to the natural calamities, then, domain ontologies related to the verified events, the natural calamities, the region of interest (ROI) characteristics, the crop types present in the ROI, and so on that are present in the domain ontology repository are combined to generate an aligned knowledge graph (a joint knowledge graph).

The aligned knowledge graph is utilized by the semantic reasoner to generate the semantic relations or the inferences that results the crop damage due to the natural calamity event detected in the given ROI. The semantic reasoner is component that helps in generation of new information about the entities by using semantic relations and combining desperate knowledge bases or ontologies. The semantic reasoner uses domain knowledge about the area of interest, natural calamity, and crop loss. Further, the semantic reasoner uses document matching and ranking approach to merge multiple knowledge bases to generate detailed information about the natural calamity and the respective impact on the crop on selected area. The generated information includes but not limited to a) calamity specific thresholds for crop and region, b) calamity specific satellite data processing steps, c) generate summary of insights specific to the calamity, the ROI, the crops, and the extent of damage.

The damage assessment reporter creates a crop damage assessment report along with the insights. The damage assessment report includes the extent of damage specific to the crops, the ROI, and the natural calamities with the summary of insights generated by semantic reasoner and validated by analyst. The field specific damage insights and alerts are then generated to notify the crop loss. The resulted information is stored using a blockchain framework to ensure the transparency of outcome or results from the crop damage assessment report.

In an embodiment, the domain ontology repository is stored in the repository 102*b* comprised in the memory 102 of system 100. Similarly in an embodiment, the modules such as the internet and cloud based services, the event verification module (not shown in FIG. 2), the semantic reasoner, the damage assessment report and alert, are part of the plurality of modules 102*a* comprised in the memory 102 of system 100. In an embodiment, the critical information such as the semantic relations or the inferences, the crop damage assessment report along with the insights, are stored on secure platform such as block chain technology, from time-to-time, for future use, whenever the events related to the natural calamities are detected.

Figure 3:
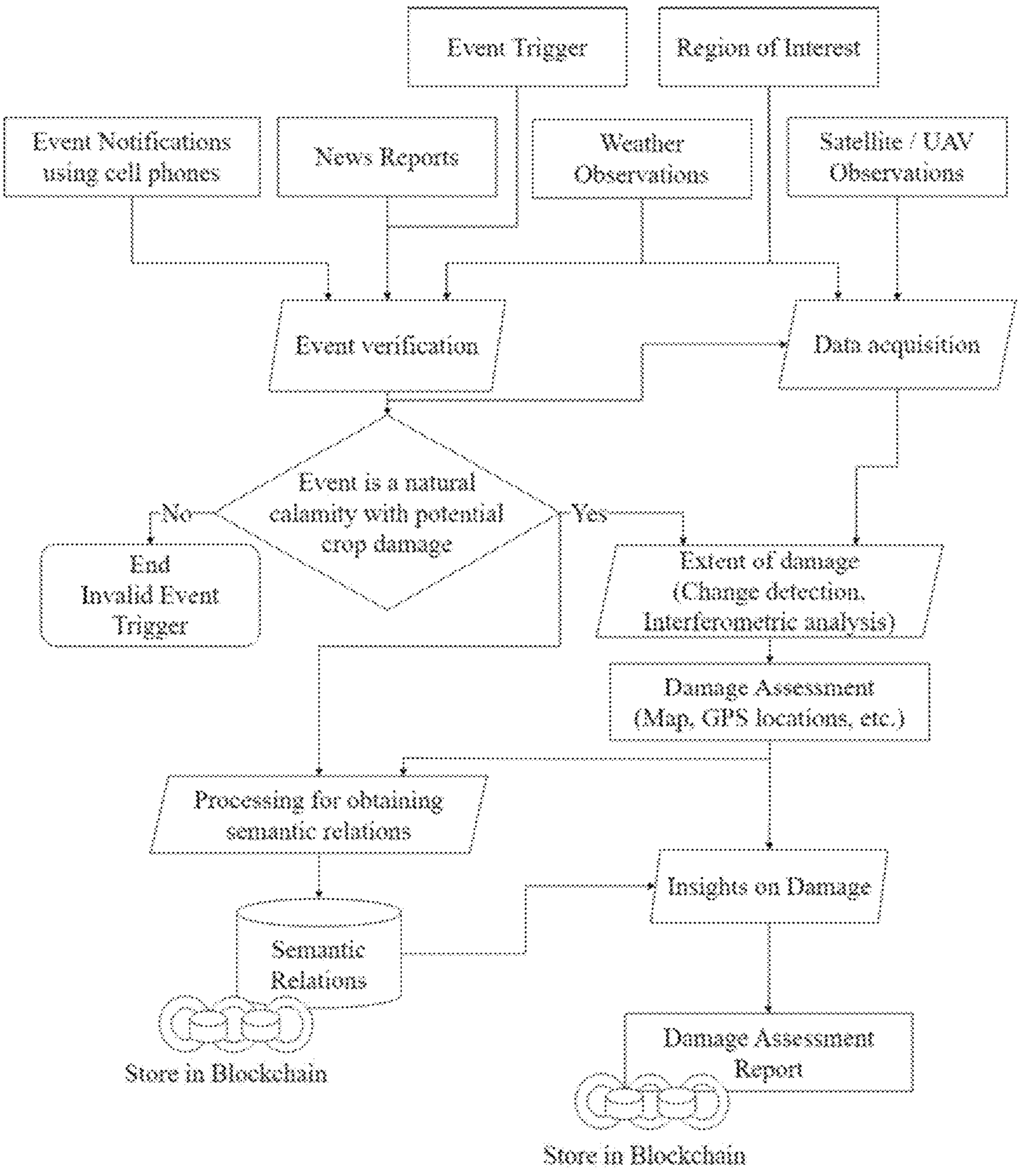
FIG. 3 is an exemplary flow diagram illustrating a processor-implemented method for crop damage assessment using semantic reasoning, in accordance with some embodiments of the present disclosure.
Figure 4A:
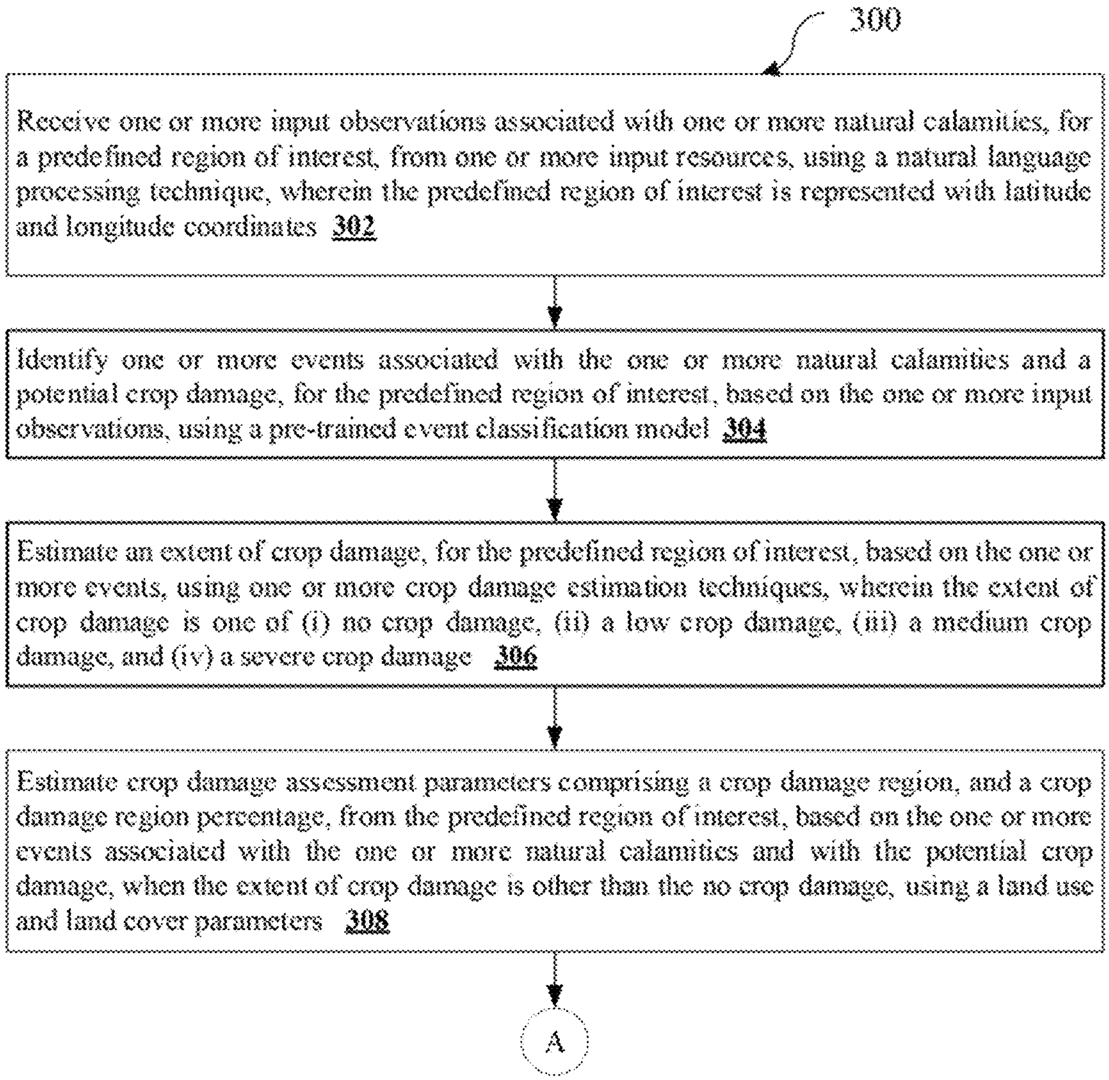
FIGS. 4A and 4B illustrate exemplary flow diagrams showing steps of a processor-implemented method of FIG. 3 for crop damage assessment using semantic reasoning, in accordance with some embodiments of the present disclosure.
Figure 4B:
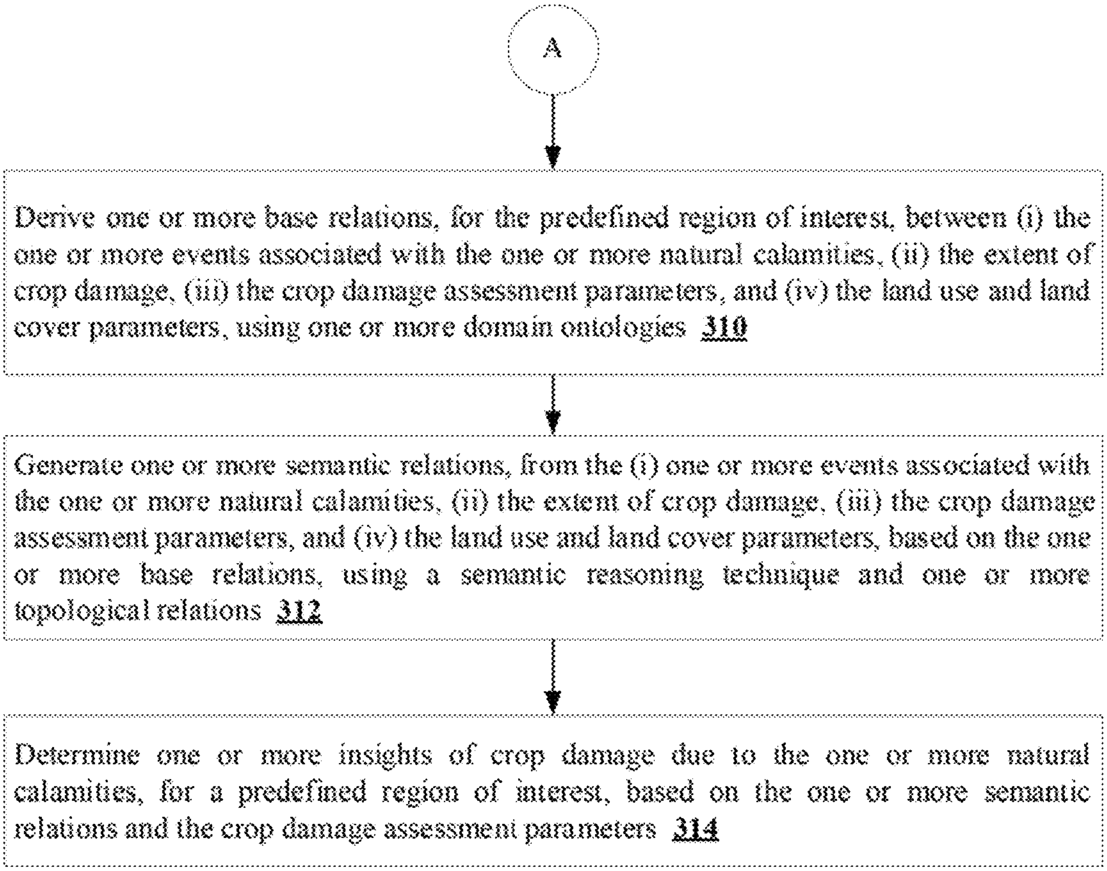

FIG. 3 is an exemplary flow diagram illustrating a processor-implemented method 300 for crop damage assessment using semantic reasoning, in accordance with some embodiments of the present disclosure. FIGS. 4A and 4B illustrate exemplary flow diagrams showing steps of a processor-implemented method 300 of FIG. 3 for crop damage assessment using semantic reasoning, in accordance with some embodiments of the present disclosure. Although the steps of the method 300 shown in FIGS. 4A and 4B including process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 302 of the method 300, the one or more hardware processors 104 of the system 100 are configured to receive one or more input observations associated with one or more natural calamities, for a predefined region of interest (ROI). In an embodiment, the one or more input observations associated with one or more natural calamities, includes but are not limited to any information related to a temperature, a relative humidity, a wind speed, an intensity and a duration of rainfall, earthquakes, and a land subsidence. In general, the one or more input observations are received when one or more events associated with one or more natural calamities, is triggered in real-time in the certain location (the predefined ROI). In an embodiment, the one or more events may be triggered automatically or manually. A trigger that triggers the events, includes information about the event type and the predefined ROI. In an embodiment, the one or more input observations associated with one or more natural calamities are received in the form of a spatio-temporal data.

The one or more input observations associated with one or more natural calamities are received from one or more input resources. In an embodiment, the one or more input resources include but are not limited to news feed, from satellite data having earth observations, field-level IoT enabled sensors installed in the predefined ROI, time-time information obtained from growers, farmers, news reporters using smart phones/mobile devices, weather stations updating agro-meterological information, social media, a social media sentiment, and a topic of news report, and so on as shown in FIG. 2. In an embodiment, the one or more input resources may be connected through internet or cloud based services with wired or wireless connection. In an embodiment, the internet or cloud based services include but not limited to a network of computers having memory for data storage and processing capabilities to execute the data processing algorithms.

In an embodiment, the field-level IoT enabled sensors may be connected to internet or cloud for collecting observations of the specific parameters like air temperature, soil temperature, leaf wetness, soil moisture, etc. The weather stations or agro-meteorological stations may be located at certain areas in a selected geography and collect observations about agricultural and weather parameters like air temperature, relative humidity, precipitation, soil moisture, etc. The time-time information obtained from growers, farmers, news reporters using smart phones (mobile devices), includes the information about the crop and farm operations are collected by farmer in application using smartphone. This information covers about type of crop, date of sowing, type of farm operation (e.g., irrigation, fertilizer application, tillage, etc.), date of farm operation, event record (e.g., pest or disease on the crop, crop damage, crop stress, etc.) etc.

In an embodiment, the satellite-based earth observations are collected through a remote sensing technology. The satellite-based earth observations include but is not limited to optical, hyperspectral, and a synthetic aperture radar (SAR) satellite data including image data.

In an embodiment, the predefined ROI is an area or fields where specific agricultural crops are being grown and where the one or more natural calamities happened. For example, agricultural crops include rice, wheat, cotton, corn, sugarcane, and so on, where the entire predefined ROI have an individual crop or multiple crop types together. The predefined ROI may be in polygon shape and includes latitude and longitude coordinates. The latitude and the longitude coordinates define the boundaries of the predefined ROI.

In an embodiment, a natural language processing (NLP) technique is applied over the information received from one or more input resources to extract the one or more input observations. More specifically, the NLP techniques includes a word, or a phrase extractor to extract the one or more such input observations.

The social media sentiment is obtained using the NLP technique. In an embodiment, the input of the NLP technique includes the social media posts like micro blog posts, public status messages, etc. The output has sentiment being a positive, a negative or a neutral. The events on social media i.e., crop damage, heavy rainfall, loss of crop and distress, have negative sentiment.

The topic of news report for the predefined ROI and the type of event is identified using the NLP technique. The input of the NLP technique is search query to find news articles related to the predefined ROI and the type of event. The NLP technique use methodologies such as but not limited to term frequency inverse document frequency (TF-IDF) to identify the documents parsed from the internet. The content of news report may cover information like damage to the crops in region x due to storm. The output is number of confirmed news reports and validation of event and the predefined ROI. E.g., 10 news reports had mention of selected region and the event type.

At step 304 of the method 300, the one or more hardware processors 104 of the system 100 are configured to identify one or more events associated with the one or more natural calamities and a potential crop damage, for the predefined ROI. Though at the step 302 of the method 300, the one or more input observations are received based on triggering certain events related to the natural calamities, it is important to verify which of the triggered events are having the potential crop damage related data. In an embodiment, the one or more events associated with the one or more natural calamities and the potential crop damage are identified (verified), using a pre-trained event classification model, based on the one or more input observations received at step 302 of the method 300.

In an embodiment, the pre-trained event classification model is obtained by training a machine learning (ML) classification model with a suitable training data. In an embodiment, the training data is associated with one or more historical input observations and corresponding one or more historical events associated with the one or more natural calamities happened with the potential crop damage. The training data is processed in the form of a plurality of training samples. For example, each training sample includes the one or more historical input observations and corresponding one or more historical events associated with the one or more natural calamities happened with the potential crop damage. Here the one or more historical input observations are considered as input parameters and the corresponding one or more historical events associated with the one or more natural calamities are considered as output parameters.

Once the training data is ready and processed, the machine learning (ML) classification model such as a random forest (RF) classification model is trained with the plurality of training samples. During the training, the one or more historical input observations present in each training sample are considered as input parameters and the corresponding one or more historical events associated with the one or more natural calamities are considered as output parameters. After the training with the plurality of training samples, the pre-trained event classification model is obtained.

The obtained pre-trained event classification model at this step can identify or verify the one or more events associated with the one or more natural calamities and the potential crop damage, based on the one or more input observations received at step 302 of the method 300.

Table 1 shows an exemplary training data used to obtain the pre-trained event classification model.

TABLE

| Sample | T (in degree Celsius) | RH (in %) | Rainfall (in mm) | Social Media Sentiment | Topic of News Report | Event identification |
|---|---|---|---|---|---|---|
| 1 | 46 | 82 | 400 | Negative | 4 | Natural Calamity with potential of crop damage |
| 2 | 28 | 79 | 180 | Positive | 1 | Natural Calamity with no potential of crop damage |

Thus, identifying the one or more events through the pre-trained event classification model is mathematically expressed as in equation 1:

$$\text{Event classification} = f\{T, RH, RF, SMS, TNR\} \tag{1}$$

Where T denotes the temperature recorded by a sensor in the field or weather observation from weather service, RH denotes the relative humidity recoded by a sensor in the field or weather observation from weather service, RF denotes the amount of rainfall in mm recorded by rain gauge on weather station, SMS denotes the social media sentiment, and TNR denotes the topic of news report for predefined ROI.

An end-to end example is defined to explain the steps of the method 300. Table 2 shows the exemplary input observations of the end-to end example, processed at step 302 of the method 300.

TABLE 2

| T (in degree Celsius) | RH (in %) | Rainfall (in mm) | Social Media Sentiment | Topic of News Report |
|---|---|---|---|---|
| 25 | 85 | 500 | Negative | 5 |
| 25 | 85 | 200 | Positive | 0 |

Table 3 shows the output of the pretrained event classification model that detect the events related to the natural calamities, based on the exemplary input observations shown in Table 2.

TABLE 3

| Event Classification | T (in degree Celsius) | RH (in %) | Rainfall (in mm) | Social Media Sentiment | Topic of News Report |
|---|---|---|---|---|---|
| Natural Calamity of flood with potential of crop damage | 25 | 85 | 500 | Negative | 5 |
| Natural Calamity with no potential of crop damage | 25 | 85 | 200 | Positive | 0 |

At step 306 of the method 300, the one or more hardware processors 104 of the system 100 are configured to estimate an extent of crop damage, for the predefined ROI, based on the one or more events, using one or more crop damage estimation techniques. The extent of crop damage for the predefined ROI is estimated only when the one or more events associated with the one or more natural calamities and the potential crop damage are identified at step 304 of the method 300. If no events are identified or the one or more events are identified but with no potential crop damage, then the method 300 stops at step 304 indicating that the one or more input observations received at step 302 have no impact with the potential crop damage. The extent of crop damage defines the one among of the plurality of (i) no crop damage, (ii) a low crop damage, (iii) a medium crop damage, and (iv) a severe crop damage.

In an embodiment, the one or more crop damage estimation techniques includes the list but are not limited to (i) a change detection technique, (ii) an interferometric analysis of the synthetic aperture radar (SAR) data, and (iii) an image differential analysis. Further in an embodiment, the one or more crop damage estimation techniques utilizes one or more parameters include but are not limited to (i) one or more normalized difference vegetation index (NDVI) differences, (ii) one or more coherence values, and (iii) one or more backscatter differences, to estimate the extent of crop damage, for the predefined ROI.

Thus, estimating the extent of crop damage may be mathematically expressed as in equation 2:

$$\text{Extent of damage} = \{ROI, NVDI \text{ differences, Coherence, backscatter difference}\} \tag{2}$$

Where RoI is the predefined ROI, NDVI differences are the one or more difference values before the event and after the event which basically detect the change in the predefined ROI, Coherence basically is an estimated coherence in SAR images obtained before and after the event observations, and backscatter difference is the difference between SAR backscatter in same and cross polarizations acquired before and after the event.

In an embodiment, the NDVI difference is calculated for the predefined ROI. The NDVI difference is calculated using the Red and Near Infra-red spectrum (NIR) collected by earth observation satellite or drone and ranges between +1 and −1. The NDVI is calculated using equation 3:

$$NDVI = \frac{NIR - \text{Red}}{NIR + \text{red}} \tag{3}$$

The NDVI before the event and the NDVI after event is used to calculate the NDVI difference using equation 4:

$$NDVI \text{ difference} = NDVI \text{ before the event} - NDVI \text{ after the event} \tag{4}$$

The NDVI difference is then used to categorize into the extent or the severity of the damage. For example, if the NDVI value before event is 0.5 and the NDVI value after event is 0.3. The NDVI difference is +0.2 (0.5-0.3), this shows a positive difference i.e., decrease in the NDVI due to the damage. The NDVI difference can have values in the range between −2 to +2. Here, values below 0 are considered as no change or positive change. Table 4 shows exemplary NDVI difference ranges used to categorize into the extent or the severity of the damage. Further, these categories may change for the type of event.

TABLE 4

| SN | NDVI Difference Range | Extent of Damage |
|---|---|---|
| 1 | Less than 0 | No Damage |
| 2 | Greater than equal to 0 and less than 0.5 | Low damage |
| 3 | Greater than equal to 0.5 and less than 1.0 | Medium damage |
| 4 | Greater than equal to 1.0 and less than equal to 2 | Severe damage |

In another embodiment, the coherence is calculated for the predefined ROI. The coherence is calculated using the earth observations obtained using the synthetic aperture radar (SAR) satellite or drone data. The coherence calculation involves use of Interferometry of SAR observations before event and after event. The coherence ranges between 0 and 1. Table 5 shows exemplary coherence ranges used to categorize into the extent or the severity of the damage.

TABLE 5

| SN | Coherence Range | Extent of Damage |
|---|---|---|
| 1 | Greater than equal to 0 and less than 0.4 | No Coherence. High damage. |
| 2 | Greater than equal to 0.4 and above | Low damage |

In another embodiment, the normalized ratio between bands is calculated for SAR vertical-vertical (VV) and vertical-horizontal (VH) or horizontal-horizontal-horizontal (HH) and horizontal-vertical (HV) polarization. The normalized ratio between bands is calculated between VV and VH or HH and HV polarization. The normalized ratio between bands is calculated for the predefined ROI either using equation 5 or equation 6:

$$\text{Normalized ratio between bands} = \left((VH - VV)/(VH + VV)\right) \tag{5}$$

$$\text{Normalized ratio between bands} = \left((HH - HV)/(HH + HV)\right) \tag{6}$$

The difference between normalized ratio between bands before the event and after the event is used to calculate the extent of the damage using equation 7:

$$\text{Normalized ratio between bands} = \text{Normalized ratio between bands before the event} - \text{Normalized ratio between bands after the event} \tag{7}$$

Table 6 shows exemplary of normalized ratio between bands used to categorize into the extent or the severity of the damage. Further, these categories may change for the type of event.

TABLE 6

| SN | Normalized ratio between bands | Extent of Damage |
|---|---|---|
| 1 | Less than 0 | No Damage |
| 2 | Greater than equal to 0 and less than 0.3 | Low damage |
| 3 | Greater than equal to 0.3 and less than 1.0 | Medium damage |
| 4 | Greater than equal to 1.0 and less than equal to 2 | Severe damage |

In an embodiment, the NDVI difference, Coherence, difference in Normalized Ratio between Bands, are calculated for each pixel of the predefined ROI. The pixel represents the area of approximately 10 meter×10 meter on ground for Sentinel 1 and 2 satellite image data. The pixel size varies with the satellite or done camera (image sensor).

At step 308 of the method 300, the one or more hardware processors 104 of the system 100 are configured to estimate one or more crop damage assessment parameters, from the predefined ROI, based on the one or more events associated with the one or more natural calamities and with the potential crop damage identified at step 302 of the method 300, and the extent of damage estimated at step 306 of the method 300. The one or more crop damage assessment parameters are estimated only when the extent of crop damage estimated at step 306 of the method 300 is other than the no crop damage. If the extent of crop damage is no crop damage estimated at step 306 of the method 300, then the method 300 stops at step 306 indicating that the one or more input observations received at step 302 have no impact with the potential crop damage.

In an embodiment, the one or more crop damage assessment parameters include a crop damage region, and a crop damage region percentage, and such one or more crop damage assessment parameters are estimated using one or more land use and land cover (LULC) parameters. The crop damage region defines the boundaries of the area where the crop damage is estimated, and the crop damage region percentage is the percentage crop damage region out of the predefined ROI where the crop damage is to be estimated.

Thus, the one or more crop damage assessment parameters provide a map of ROI affected due to selected event, type of damage i.e., high, medium, low and percentage of damage, from the predefined ROI. The one or more crop damage assessment parameters are estimated using equation 8:

$$\text{Crop damage assesment parameters} = f\{\text{predefined } ROI, \text{ land use or land cover parameters, type of event, extent of damage}\} \quad (8)$$

Here, the one or more LULC parameters define a list of land classes called as land use and land cover (LULC) classes including but are not limited to water, urban, forest, desert, agriculture, snow, glacial, etc. The LULC has pixel information about the classes for selected ROI. After having the LULC the predefined ROI can be divided into fraction of area under each class. The type of event is the natural calamity event like, flood, hailstorm, cyclone, desert locust, etc., The extent of damage is the ROI Specific changes occurred in the region in raster data format.

Table 7 shows an example for ROI of area 35 square kilometer. The LULC is obtained from the open-source external entities (like National Remote Sensing Centre (NRSC), United States Department of Agriculture (USDA), etc.) or can also be generated by using classification algorithms. Where training data is generated using the ground truth collected by field visits and satellite data obtained using sensors like but not limited to Sentinel 1, 2 or 10 Landsat 8 or Landsat 9.

TABLE 7

| LULC Class (parameter) | Area (in sq. km.) |
|---|---|
| Water | 7 |
| Urban | 2 |
| Forest | 10 |
| Agriculture | 15 |
| Desert | 1 |
| Snow (Glacial) | 0 |

Using the ROI, the LULC pixels of agriculture are selected. Then for each of these pixels the information about the extent of the damage is selected. At this stage the information about type of event and event's potential to cause the damage are considered. Further, the percentage of damage is calculated using equation 9:

$$\text{Crop damage region \%} = \left((\text{Selected } ROI \text{ damage area under high, medium and low})/\text{total area}\right) \quad (9)$$

Table 8 shows exemplary crop damage assessment parameters estimated for the detected the events related to the natural calamities in table 3, based on the input observations shown in Table 2.

TABLE 8

| SN | ROI | LULC Class and Area (in square meter) | Type of event | Extent of Damage (damage category and area in square meter) | Crop damage region (in percentage) |
|---|---|---|---|---|---|
| 1 | Field 1 | Agriculture (3000) | Flood | High (100), Medium (200), Low (300), No damage (2400) | 20 |
| 2 | Field 2 | Agriculture (50000) | Flood | High (10000), Medium (20000), Low (10000), No damage (10000) | 80 |
| 3 | Region 1 | Agriculture (7000) | Flood | High (1000), Medium (1000), Low (2000), No damage (3000) | 57 |
| 4 | Region 2 | Agriculture (5000) | Flood | High (500), Medium (2000), Low (500), No damage (2000) | 60 |

At step 310 of the method 300, the one or more hardware processors 104 of the system 100 are configured to derive one or more base relations, for the predefined ROI, between (i) the one or more events associated with the one or more natural calamities, identified at step 304 of the method 300, (ii) the extent of crop damage estimated at step 306 of the method 300, (iii) the one or more crop damage assessment parameters estimated at step 308 of the method 300, and (iv) the one or more LULC parameters. The one or more base relations, for the predefined ROI, are derived using one or more domain ontologies.

Firstly, the one or more domain ontologies are extracted based on the one or more events associated with the one or more natural calamities, based on the crop type, from the domain ontology repository. Then, the one or more domain ontologies are aligned using the NLP technique, to obtain an aligned domain ontology. The aligned domain ontology comprises the one or more base relations between (i) the one or more events associated with the one or more natural calamities, (ii) the extent of crop damage, (iii) the one or more crop damage assessment parameters, and (iv) the one or more LULC parameters.

In an embodiment, the one or more base relations are the base relationships between the ROI, the one or more LULC parameters, the type of event, the extent of damage, and the one or more crop damage assessment parameters, and such base relations are defined using domain ontologies. In an embodiment, the domain ontologies are either created using domain knowledge or sourced from public domain like DBpedia, FAO AgroVoc, etc. Further, the domain knowledge of the agriculture is used which includes but not limited to information about the crop, crop variety, crop management practices, tolerance of crop to various conditions such as excess water, soil pH, soil salinity, wind speed, minimum and maximum temperature, minimum and maximum relative humidity, minimum and maximum precipitation and electrical conductivity. It also includes the region-specific crop soil suitability and potential yield, and nutrient uptake related information.

The base relationships help to store the knowledge from real world into documents. It includes but not limited to formats such as Resource Description Framework (RDF) triple store or Labeled Property Graphs (LPG). Here, the base relations are expressed as a function of ROI, LULC, the type of event, extent of damage and the one or more crop damage assessment parameters, and is mathematically expressed as in equation 10:

$$\text{base realtions} = f\{ROI, LULC, \text{event, extent of damage, damage assesment parameters}\} \quad (10)$$

In an embodiment, the domain ontologies are merged and aligned using semi-automatic ontology matching technique (using statistical techniques). The techniques include Term Frequency Inverse Document Frequency (TF-IDF), Pareto optimization and tools like LogMap, and so on.

Figure 5:
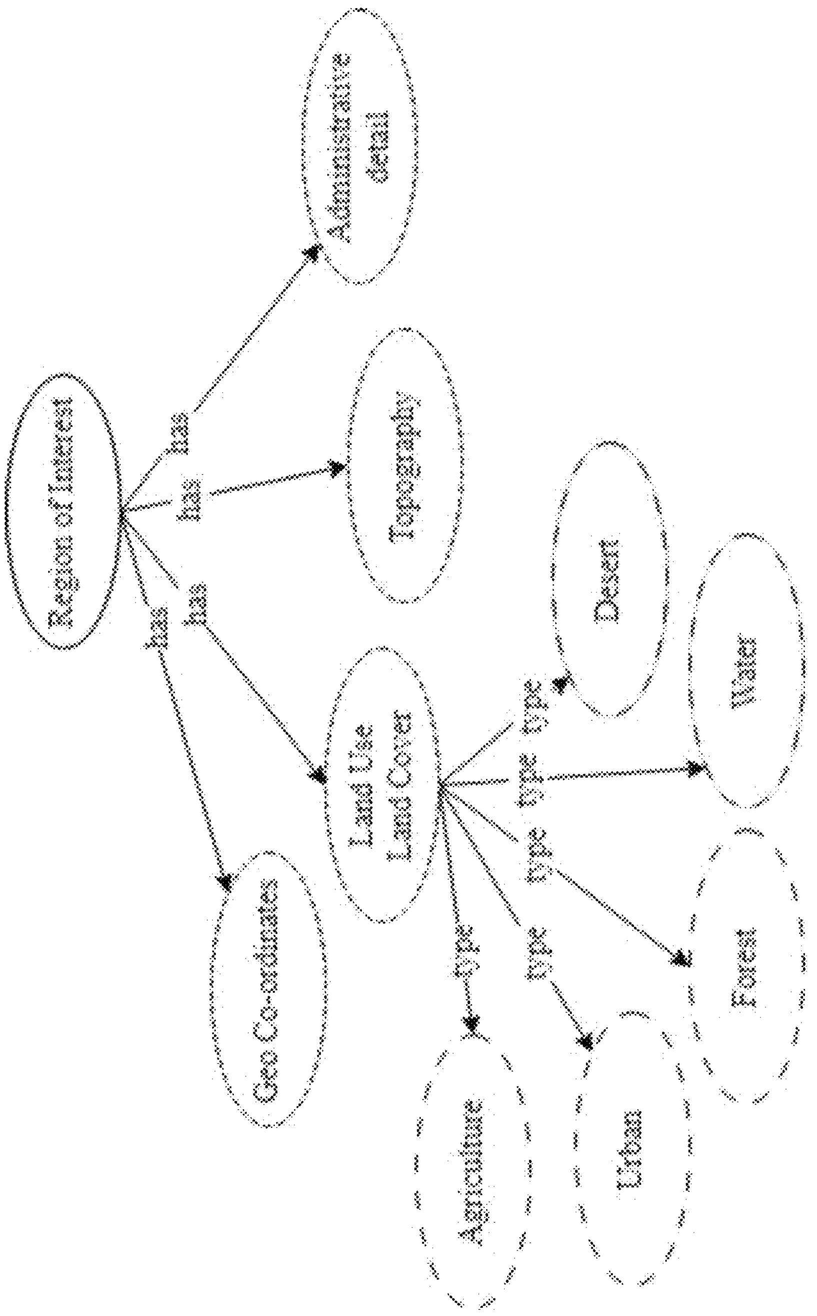
FIGS. 5, 6, and 7, show exemplary knowledge graphs for the area of interest, a flood natural calamity, and the crop damage, respectively, in accordance with some embodiments of the present disclosure.
Figure 6:
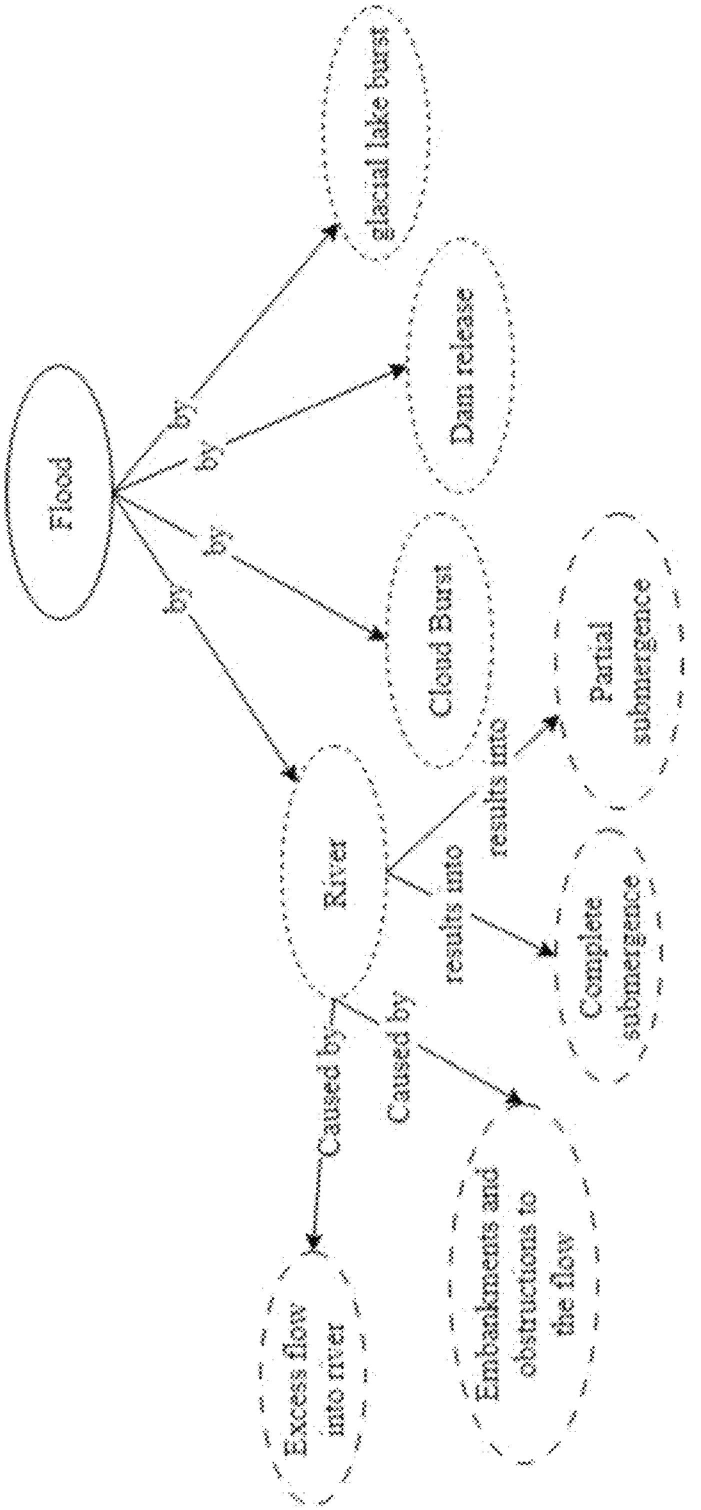
Figure 7:
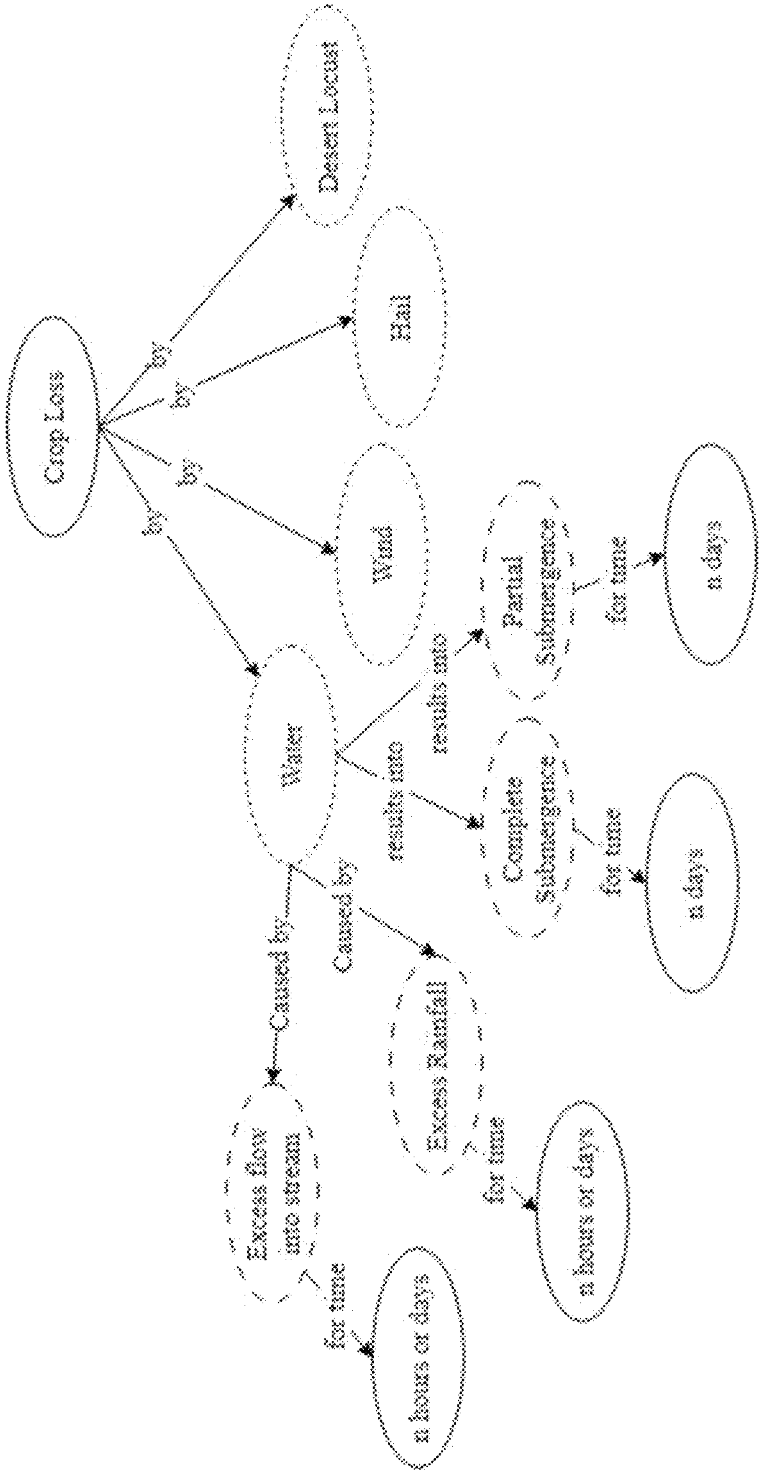
Figure 8:
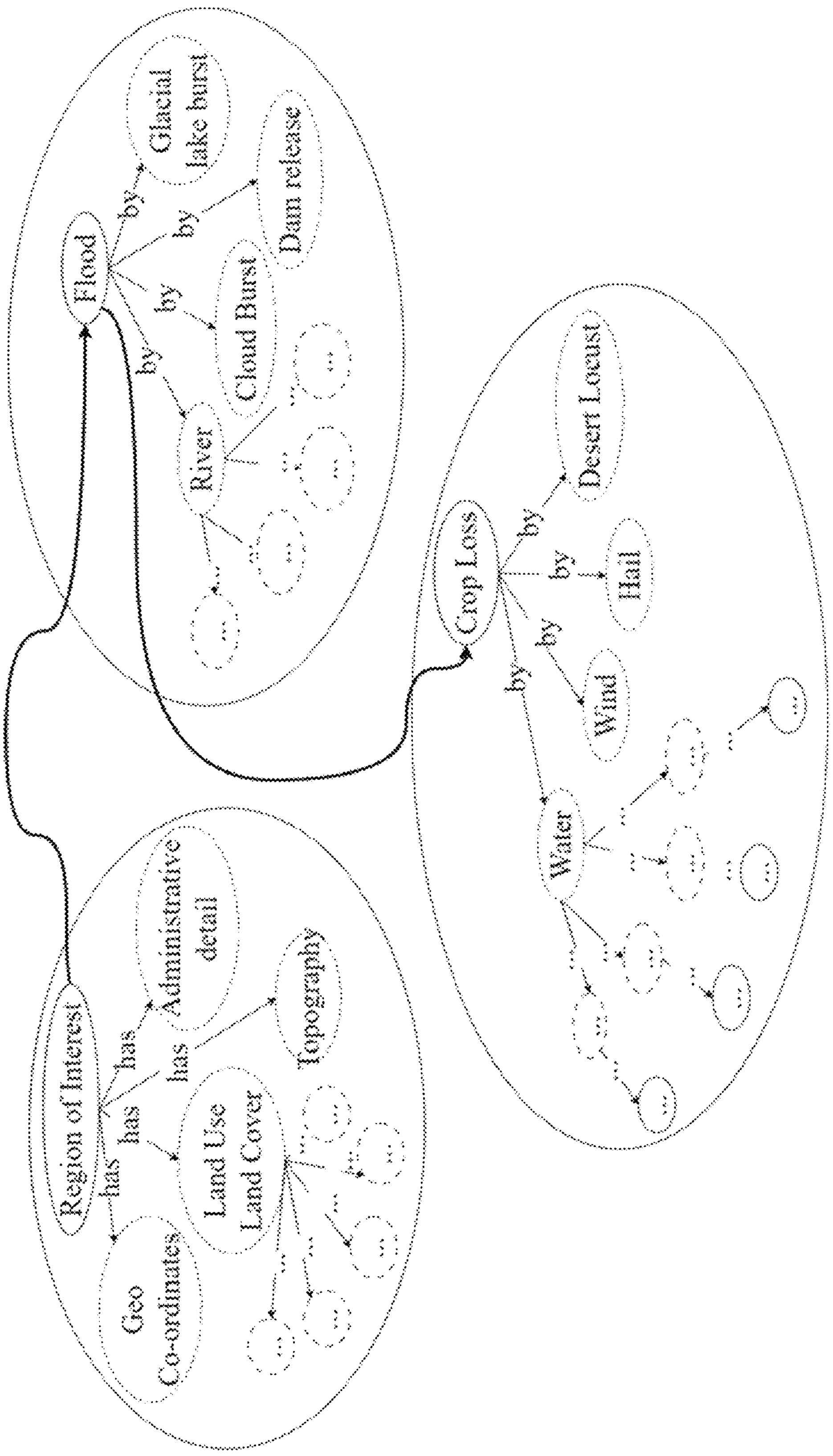
FIG. 8 shows an exemplary aligned knowledge graph that resulted by aligning the exemplary knowledge graphs of FIGS. 5, 6, and 7, in accordance with some embodiments of the present disclosure.

FIGS. 5, 6, and 7, show exemplary knowledge graphs for the area of interest, a flood natural calamity, and the crop damage, respectively, in accordance with some embodiments of the present disclosure. As shown in FIG. 5, the knowledge graph of the area of interest includes domain knowledge about the area with respective inter-relations. For example, the area of interest has geo-coordinates, LULC classes (areas), topography and administrative details. The LULC classes have agriculture area, urban area, forest area, water area, and desert area. Similarly, as shown in FIG. 6, the knowledge graph of the natural calamity of type flood, includes domain knowledge about the various influencing factors that cause the floods and their consequences. Similarly, as shown in FIG. 7, the knowledge graph of the crop damage, includes domain knowledge about the various influencing factors that cause the crop damages and their consequences. FIG. 8 shows an exemplary aligned knowledge graph that resulted by aligning the exemplary knowledge graphs of FIGS. 5, 6, and 7, in accordance with some embodiments of the present disclosure.

At step 312 of the method 300, the one or more hardware processors 104 of the system 100 are configured to generate one or more semantic relations, based on the one or more base relations derived at step 310 of the method 300. The one or more semantic relations are generated from the (i) one or more events associated with the one or more natural calamities identified at step 304, (ii) the extent of crop damage estimated at step 306, (iii) the one or more crop damage assessment parameters estimated at step 308, and (iv) the one or more LULC parameters. In an embodiment, a semantic reasoning technique and one or more topological relations are employed to generate the one or more semantic relations, based on the one or more base relations. The one or more topological relations refer to the geo-metric relations of the ROI with various field areas and their relationships. The semantic reasoner includes the semantic reasoning technique, where the above-mentioned input information is reasoned over the aligned knowledge graph obtained at step 310, to generate the one or more semantic relations.

Firstly, one or more tokens are retrieved from an information related to the one or more events associated with the one or more natural calamities, for the predefined ROI, using the NLP technique. Each token is one among a word, a character, and a group of characters present in the information related to the one or more events associated with the one or more natural calamities. Next the one or more tokens, are queried over the one or more base relations, using (i) the semantic reasoning technique, and (ii) the one or more topological relations, to generate the one or more semantic relations, based on (i) the one or more events associated with the one or more natural calamities, (ii) the extent of crop damage, (iii) the one or more crop damage assessment parameters, and (iv) the one or more LULC parameters.

In an embodiment, the one or more semantic relations are represented in the form of the RDF triple store having a subject, a predicate, and an object. Table 9 shows the semantic relations derived for the input parameters shown in table 8, using the exemplary aligned knowledge graph of FIG. 8.

TABLE 9

| Subject | Predicate | Object |
|---|---|---|
| ROI | has | LULC |
| LULC | has | Type |
| Type of Event | isCausedBy | Natural Calamity |
| Extent of damage | isCausedBy | Natural Calamity |
| Type of Event | has | Extent of damage |
| Natural Calamity | isCausedBy | Flood |
| Flood | isCausedBy | River |
| ROI | has | Crop Loss |
| Crop Loss | isCausedBy | Flood |

As shown in table 9, the one or more semantic relations are mentioned below:

Semantic relation 1: ROI has LULC is obtained from domain ontology of Area of interest.

Semantic relation 2: LULC has type is obtained from domain ontology of Area of interest.

Semantic relation 3: Type of event is caused by natural calamity is obtained from domain knowledge about the natural calamity.

Semantic relation 4: Extent of damage is caused by natural calamity is obtained from domain knowledge about the crop loss.

At step 314 of the method 300, the one or more hardware processors 104 of the system 100 are configured to determine one or more insights of crop damage due to the one or more natural calamities, for a predefined ROI. The one or more insights of crop damage are determined based on the one or more semantic relations generated at step 312 of the method 300 and using the one or more crop damage assessment parameters estimated at step 308 of the method 300. Determining the one or more insights of crop damage is mathematically expressed as in equation 11:

$$\text{insights on crop damage} = f\{\text{semantic relations, damage assesment parameters}\} \quad (11)$$

Figure 9:
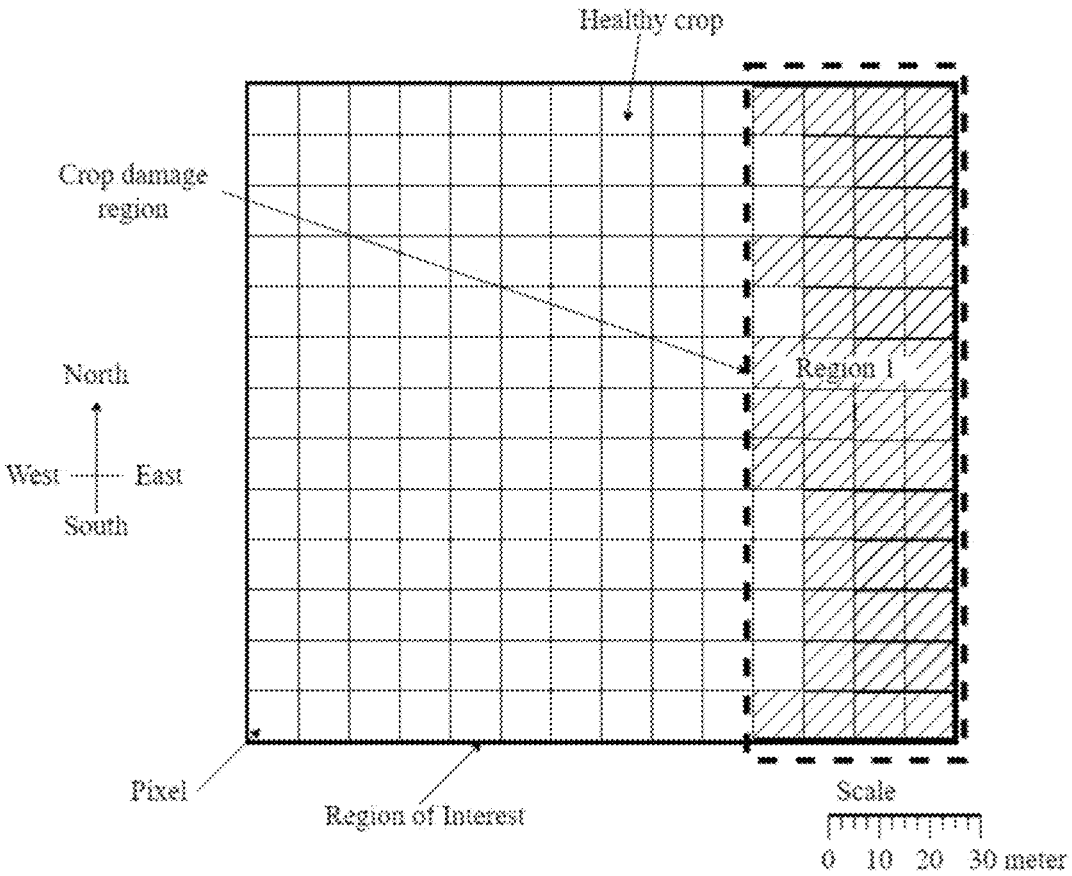
FIG. 9 illustrates an exemplary field-level crop damage report along with insights on the crop damage, in accordance with some embodiments of the present disclosure.

FIG. 9 illustrates an exemplary field-level crop damage report along with insights on the crop damage, in accordance with some embodiments of the present disclosure. As shown in FIG. 9, below are the insights (also referred as inferences) of the crop damage for the semantic relations generated and shown in Table 9 for field 1 mentioned in Table 8.

1. ROI Field 1 has total 20 percent damage
2. ROI Field 1 has high damage over 100 sq. meter area
3. ROI Field 1 has damage on east edge The insight 3 is not based on the already available information. Here, the map and data derived in extent of damage step (i.e., step 304) is used. Then each pixel is converted to point having latitude and longitude information along with the damage type and other previously associated information. Then Geographic Information System (GIS) based query is used to calculate the alignment of damage with respect to ROI. The GIS query calculates the centroid of ROI as point and then calculates the angle from North to each pixel. Finally, all angles are for damaged pixels are averaged and generalized direction is calculated using the threshold i.e., angle 315 to 45=North, angle 45 to 135=East.

Similarly, for South and West. The directions are not limited to North, South, and East, West.

Figure 10:
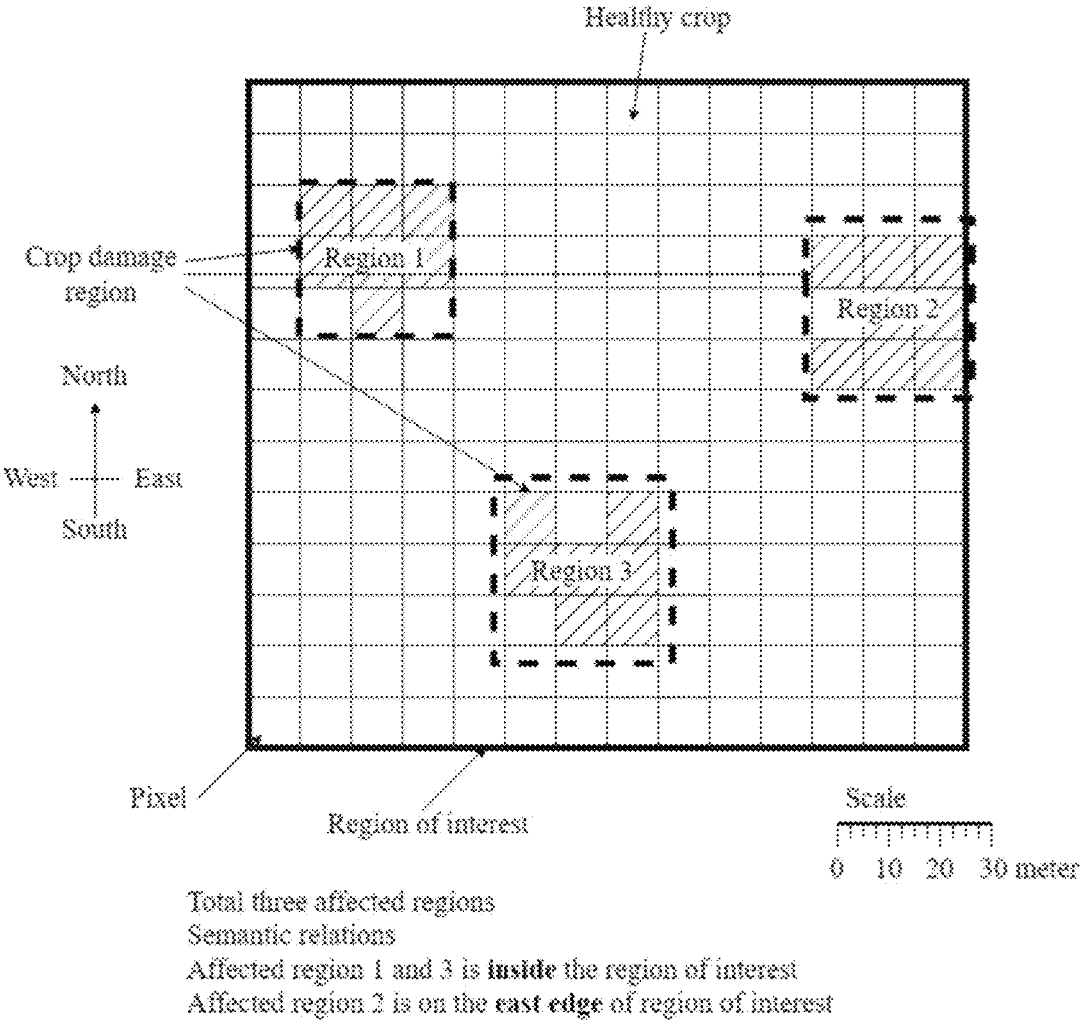
FIG. 10 illustrates another exemplary field-level crop damage report along with the insights on the crop damage, in accordance with some embodiments of the present disclosure.

FIG. 10 illustrates another exemplary field-level crop damage report along with the insights on the crop damage, in accordance with some embodiments of the present disclosure. As shown in FIG. 10, below are the insights of the crop damage for the semantic relations generated and shown in Table 9 for field 2 mentioned in Table 8.

1. ROI Field 2 has total 10 percent damage
2. ROI Field 2 has high damage over 1000 sq. meter area
3. ROI Field 2 has three damaged regions
4. Damage region 1 and 3 is inside the ROI
5. Damage region 2 is on the east edge of ROI Here insight 4 and 5 are derived using the semantic reasoner and topological operations.

Hence the methods and systems of the present disclosure, have capability to interlink the multiple data sets like satellite-based earth observations, weather observations from IoT sensors, crop knowledge base and disaster domain knowledge for the crop damage assessment using the domain ontologies and the semantic reasoning. Hence the crop damage assessment is accurate and effective, irrespective of the natural calamity type or the agricultural crop type. The present disclosure establishes automated crop loss assessment using trigger-based analysis of plurality of sources like satellite-based earth observations, weather observations, social media posts and news articles, for obtaining a spatio-temporal data. Then the spatio-temporal data is reasoned over the domain knowledge graph, using the semantic reasoning technique, for the automatic crop damage assessment. The present disclosure helps to generate the additional insights such as how much area is damaged, the directions of the area where the crop is damaged and so on.

The semantic reasoning of the present disclosure is employed on the input observations from plurality of sensors like remote sensing satellite, Weather station, IoT enabled sensors, field photographs and agriculture domain knowledge. The semantic relations between layers of sensor observations like the multi-spectral satellite images, the synthetic aperture radar satellite images, the spatio-temporal weather observations, the field photographs, and the agriculture domain knowledge are created using semantic inference engine. The semantic relations are then used to identify state of crop damage. Hence, the semantic reasoning of the present disclosure reduces time of the crop damage assessment, achieve high spatial scalability, ability to cover multiple factors and ease in using domain knowledge.

The crop damage assessment due to desert locust is inferred using semantic relations between abundance of vegetation, weather variations like temperature gradient, wind speed and direction. In this the key idea is to identify the abundance of vegetation using the satellite data and use the same information along with weather parameters such as wind speed and direction. The spatial and temporal observations are used by the semantic reasoner to automatically predict the regions where the desert locust will move from the earlier or initial location. Further, the semantic reasoner will also analyze the satellite observations to assess the details of crop loss and generate the insights on the area affected, crop types impacted, intensity of damage, etc.

The methods and systems of the present disclosure effectively assess the crop damage due to pest or diseases. Using the type of pest or/disease, the extent of damage at starting point and semantic relations are developed based on satellite and weather information, to predict the spread of that pest or disease.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of assessment of the crop damage due to the natural calamities, using the domain ontologies and a semantic reasoning over the spatio-temporal data. The present disclosure has capability to interlink the multiple data sets like satellite-based earth observations, weather observations from IoT sensors, crop knowledge base and disaster domain knowledge for the crop damage assessment using domain ontologies and semantic reasoning. Hence the methods and systems of the present disclosure is universal, which works effectively irrespective of the natural calamity type or the crop type, using the domain ontologies.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising the steps of:

receiving, via one or more hardware processors, one or more input observations associated with one or more natural calamities, for a predefined region of interest (ROI), from one or more input resources, using a natural language processing (NLP) technique, wherein the predefined region of interest (ROI) is represented with latitude and longitude coordinates;

identifying, via the one or more hardware processors, one or more events associated with the one or more natural calamities and a potential crop damage, for the predefined region of interest (ROI), based on the one or more input observations, using a pre-trained event classification model;

estimating, via the one or more hardware processors, an extent of crop damage for the predefined region of interest (ROI), based on the one or more events, using one or more crop damage estimation techniques, wherein the extent of crop damage is one of (i) no crop damage, (ii) a low crop damage, (iii) a medium crop damage, and (iv) a severe crop damage;

estimating, via the one or more hardware processors, one or more crop damage assessment parameters comprising a crop damage region, and a crop damage region percentage, from the predefined region of interest (ROI), based on the one or more events associated with the one or more natural calamities and with the potential crop damage, when the extent of crop damage is other than the no crop damage, using one or more land use and land cover (LULC) parameters;

deriving, via the one or more hardware processors, one or more base relations, for the predefined region of interest (ROI), between (i) the one or more events associated with the one or more natural calamities, (ii) the extent of crop damage, (iii) the one or more crop damage assessment parameters, and (iv) the one or more land use and land cover (LULC) parameters, using one or more domain ontologies;

generating, via the one or more hardware processors, one or more semantic relations from the (i) one or more events associated with the one or more natural calamities, (ii) the extent of crop damage, (iii) the one or more crop damage assessment parameters, and (iv) the one or more land use and land cover (LULC) parameters, based on the one or more base relations, using a semantic reasoning technique and one or more topological relations; and determining, via the one or more hardware processors, one or more insights of crop damage due to the one or more natural calamities, for the predefined region of interest (ROI), based on the one or more semantic relations and the one or more crop damage assessment parameters.

2. The processor-implemented method of claim 1, wherein the one or more input observations associated with one or more natural calamities comprises a temperature, a relative humidity, a wind speed, an intensity and a duration of rainfall, earthquakes, a land subsidence, a social media sentiment, and a topic of news report.

3. The processor-implemented method of claim 1, wherein the pre-trained event classification model is obtained by:

receiving a training data comprising a plurality of training samples, wherein the training data is associated with one or more historical input observations and corresponding one or more historical events associated with the one or more natural calamities causing the potential crop damage; and training a machine learning (ML) classification model, with the plurality of training samples present in the training data, to obtain the pre-trained event classification model.

4. The processor-implemented method of claim 1, wherein the one or more crop damage estimation techniques are (i) a change detection technique, (ii) an interferometric analysis of synthetic aperture radar (SAR) data, and (iii) an image differential analysis.

5. The processor-implemented method of claim 1, wherein the one or more crop damage estimation techniques utilizes one or more parameters comprising (i) one or more normalized difference vegetation index (NDVI) differences, (ii) one or more coherence values, and (iii) one or more backscatter differences, to estimate the extent of crop damage, for the predefined region of interest (ROI).

6. The processor-implemented method of claim 1, wherein the one or more base relations, for the predefined region of interest (ROI), are derived by:

identifying the one or more domain ontologies based on the one or more events associated with the one or more natural calamities, from a domain ontology repository; and aligning the one or more domain ontologies, using the natural language processing (NLP) technique, to obtain an aligned domain ontology, wherein the aligned domain ontology comprises the one or more base relations between (i) the one or more events associated with the one or more natural calamities, (ii) the extent of crop damage, (iii) the one or more crop damage assessment parameters, and (iv) the one or more land use and land cover (LULC) parameters.

7. The processor-implemented method of claim 1, wherein the one or more semantic relations, are generated by:

retrieving one or more tokens, from an information related to the one or more events associated with the one or more natural calamities, for the predefined region of interest (ROI), using the natural language processing (NLP) technique, wherein each token is one among a word, a character, and a group of characters present in the information related to the one or more events associated with the one or more natural calamities; and querying the one or more tokens, over the one or more base relations, using (i) the semantic reasoning technique and (ii) the one or more topological relations, to generate the one or more semantic relations, based on (i) the one or more events associated with the one or more natural calamities, (ii) the extent of crop damage, (iii) the one or more crop damage assessment parameters, and (iv) the one or more land use and land cover (LULC) parameters.

8. A system comprising:

a memory storing instructions;

one or more input/output (I/O) interfaces; and one or more hardware processors coupled to the memory via the one or more I/O interfaces, wherein the one or more hardware processors are configured by the instructions to:

receive one or more input observations associated with one or more natural calamities, for a predefined region of interest (ROI), from one or more input resources, using a natural language processing (NLP) technique, wherein the predefined region of interest (ROI) is represented with latitude and longitude coordinates;

identify one or more events associated with the one or more natural calamities and a potential crop damage, for the predefined region of interest (ROI), based on the one or more input observations, using a pre-trained event classification model;

estimate an extent of crop damage for the predefined region of interest (ROI), based on the one or more events, using one or more crop damage estimation techniques, wherein the extent of crop damage is one of (i) no crop damage, (ii) a low crop damage, (iii) a medium crop damage, and (iv) a severe crop damage;

estimate one or more crop damage assessment parameters comprising a crop damage region, and a crop damage region percentage, from the predefined region of interest (ROI), based on the one or more events associated with the one or more natural calamities and with the potential crop damage, when the extent of crop damage is other than the no crop damage, using one or more land use and land cover (LULC) parameters;

derive one or more base relations, for the predefined region of interest (ROI), between (i) the one or more events associated with the one or more natural calamities, (ii) the extent of crop damage, (iii) the one or more crop damage assessment parameters, and (iv) the one or more land use and land cover (LULC) parameters, using one or more domain ontologies;

generate one or more semantic relations from the (i) one or more events associated with the one or more natural calamities, (ii) the extent of crop damage, (iii) the one or more crop damage assessment parameters, and (iv) the one or more land use and land cover (LULC) parameters, based on the one or more base relations, using a semantic reasoning technique and one or more topological relations; and determine one or more insights of crop damage due to the one or more natural calamities, for the predefined region of interest (ROI), based on the one or more semantic relations and the one or more crop damage assessment parameters.

9. The system of claim 8, wherein the one or more input observations associated with one or more natural calamities comprises a temperature, a relative humidity, a wind speed, an intensity and a duration of rainfall, earthquakes, a land subsidence, a social media sentiment, and a topic of news report.

10. The system of claim 8, wherein the one or more hardware processors are configured to obtain the pre-trained event classification model, by:

receiving a training data comprising a plurality of training samples, wherein the training data is associated with one or more historical input observations and corresponding one or more historical events associated with the one or more natural calamities causing the potential crop damage; and training a machine learning (ML) classification model, with the plurality of training samples present in the training data, to obtain the pre-trained event classification model.

11. The system of claim 8, wherein the one or more crop damage estimation techniques are (i) a change detection technique, (ii) an interferometric analysis of synthetic aperture radar (SAR) data, and (iii) an image differential analysis.

12. The system of claim 8, wherein the one or more crop damage estimation techniques utilizes one or more parameters comprising (i) one or more normalized difference vegetation index (NDVI) differences, (ii) one or more coherence values, and (iii) one or more backscatter differences, to estimate the extent of crop damage, for the predefined region of interest (ROI).

13. The system of claim 8, wherein the one or more hardware processors are configured to derive the one or more base relations, for the predefined region of interest (ROI), by:

identifying the one or more domain ontologies based on the one or more events associated with the one or more natural calamities, from a domain ontology repository; and aligning the one or more domain ontologies, using the natural language processing (NLP) technique, to obtain an aligned domain ontology, wherein the aligned domain ontology comprises the one or more base relations between (i) the one or more events associated with the one or more natural calamities, (ii) the extent of crop damage, (iii) the one or more crop damage assessment parameters, and (iv) the one or more land use and land cover (LULC) parameters.

14. The system of claim 8, wherein the one or more hardware processors are configured to generate the one or more semantic relations, by:

retrieving one or more tokens, from an information related to the one or more events associated with the one or more natural calamities, for the predefined region of interest (ROI), using the natural language processing (NLP) technique, wherein each token is one among a word, a character, and a group of characters present in the information related to the one or more events associated with the one or more natural calamities; and querying the one or more tokens, over the one or more base relations, using (i) the semantic reasoning technique and (ii) the one or more topological relations, to generate the one or more semantic relations, based on (i) the one or more events associated with the one or more natural calamities, (ii) the extent of crop damage, (iii) the one or more crop damage assessment parameters, and (iv) the one or more land use and land cover (LULC) parameters.

15. One or more non-transitory machine-readable information storage mediums comprising one or more instructions which when executed by one or more hardware processors cause:

receiving one or more input observations associated with one or more natural calamities, for a predefined region of interest (ROI), from one or more input resources, using a natural language processing (NLP) technique, wherein the predefined region of interest (ROI) is represented with latitude and longitude coordinates;

identifying one or more events associated with the one or more natural calamities and a potential crop damage, for the predefined region of interest (ROI), based on the one or more input observations, using a pre-trained event classification model;

estimating an extent of crop damage for the predefined region of interest (ROI), based on the one or more events, using one or more crop damage estimation techniques, wherein the extent of crop damage is one of (i) no crop damage, (ii) a low crop damage, (iii) a medium crop damage, and (iv) a severe crop damage;

estimating one or more crop damage assessment parameters comprising a crop damage region, and a crop damage region percentage, from the predefined region of interest (ROI), based on the one or more events associated with the one or more natural calamities and with the potential crop damage, when the extent of crop damage is other than the no crop damage, using one or more land use and land cover (LULC) parameters;

deriving one or more base relations, for the predefined region of interest (ROI), between (i) the one or more events associated with the one or more natural calamities, (ii) the extent of crop damage, (iii) the one or more crop damage assessment parameters, and (iv) the one or more land use and land cover (LULC) parameters, using one or more domain ontologies;

generating one or more semantic relations from the (i) one or more events associated with the one or more natural calamities, (ii) the extent of crop damage, (iii) the one or more crop damage assessment parameters, and (iv) the one or more land use and land cover (LULC) parameters, based on the one or more base relations, using a semantic reasoning technique and one or more topological relations; and determining one or more insights of crop damage due to the one or more natural calamities, for the predefined region of interest (ROI), based on the one or more semantic relations and the one or more crop damage assessment parameters.

16. The one or more non-transitory machine-readable information storage mediums of claim 15, wherein the one or more input observations associated with one or more natural calamities comprises a temperature, a relative humidity, a wind speed, an intensity and a duration of rainfall, earthquakes, a land subsidence, a social media sentiment, and a topic of news report.

17. The one or more non-transitory machine-readable information storage mediums of claim 15, wherein the pre-trained event classification model is obtained by receiving a training data comprising a plurality of training samples, wherein the training data is associated with one or more historical input observations and corresponding one or more historical events associated with the one or more natural calamities causing the potential crop damage; and training a machine learning (ML) classification model, with the plurality of training samples present in the training data, to obtain the pre-trained event classification model.

18. The one or more non-transitory machine-readable information storage mediums of claim 15, wherein the one or more crop damage estimation techniques are (i) a change detection technique, (ii) an interferometric analysis of synthetic aperture radar (SAR) data, and (iii) an image differential analysis, and utilizes one or more parameters comprising (i) one or more normalized difference vegetation index (NDVI) differences, (ii) one or more coherence values, and (iii) one or more backscatter differences, to estimate the extent of crop damage, for the predefined region of interest (ROI).

19. The one or more non-transitory machine-readable information storage mediums of claim 15, wherein the one or more base relations, for the predefined region of interest (ROI), are derived by:

identifying the one or more domain ontologies based on the one or more events associated with the one or more natural calamities, from a domain ontology repository; and aligning the one or more domain ontologies, using the natural language processing (NLP) technique, to obtain an aligned domain ontology, wherein the aligned domain ontology comprises the one or more base relations between (i) the one or more events associated with the one or more natural calamities, (ii) the extent of crop damage, (iii) the one or more crop damage assessment parameters, and (iv) the one or more land use and land cover (LULC) parameters.

20. The one or more non-transitory machine-readable information storage mediums of claim 15, wherein the one or more semantic relations, are generated by:

retrieving one or more tokens, from an information related to the one or more events associated with the one or more natural calamities, for the predefined region of interest (ROI), using the natural language processing (NLP) technique, wherein each token is one among a word, a character, and a group of characters present in the information related to the one or more events associated with the one or more natural calamities; and querying the one or more tokens, over the one or more base relations, using (i) the semantic reasoning technique and (ii) the one or more topological relations, to generate the one or more semantic relations, based on (i) the one or more events associated with the one or more natural calamities, (ii) the extent of crop damage, (iii) the one or more crop damage assessment parameters, and (iv) the one or more land use and land cover (LULC) parameters.

* * * * *